Patented July 24, 1923.

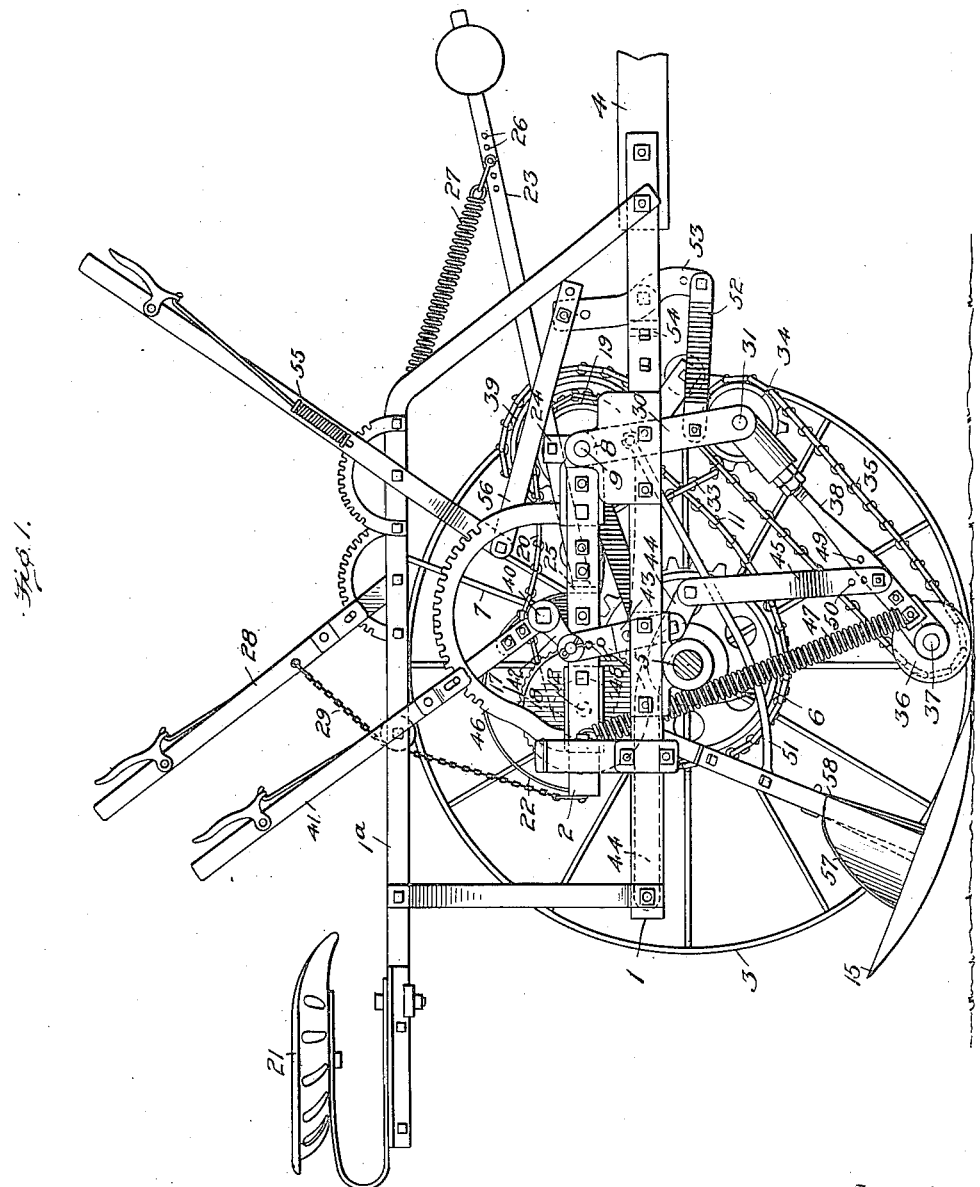

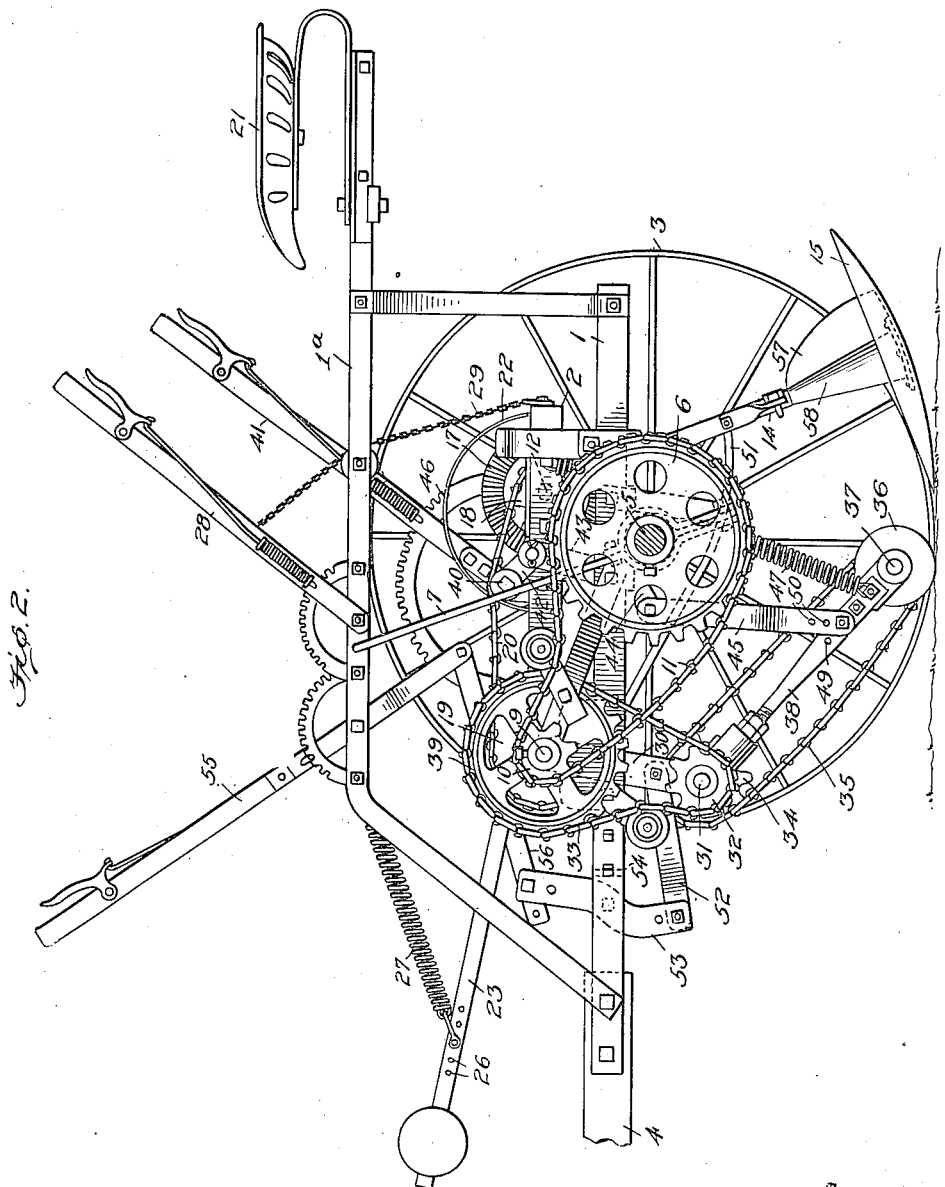

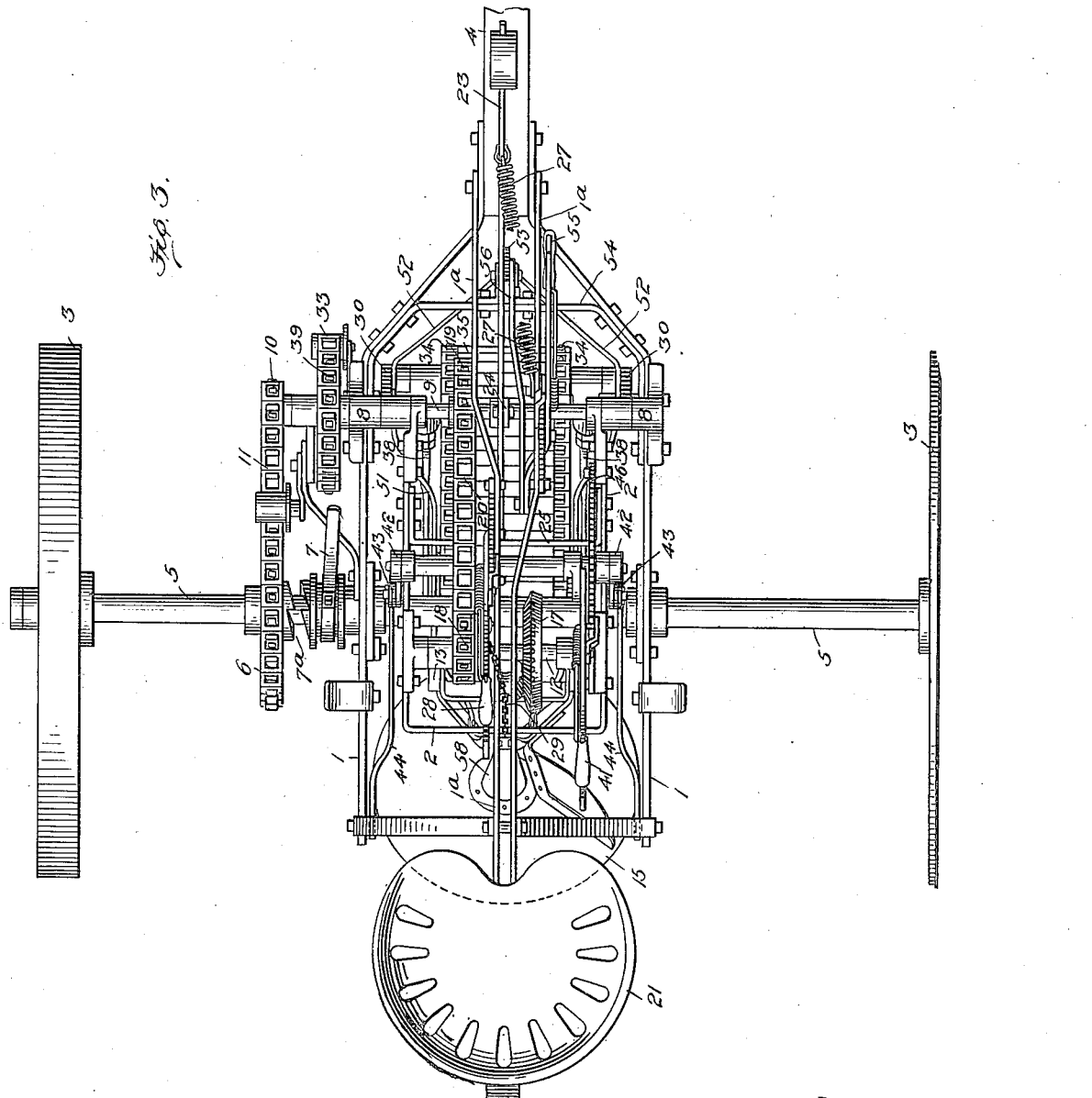

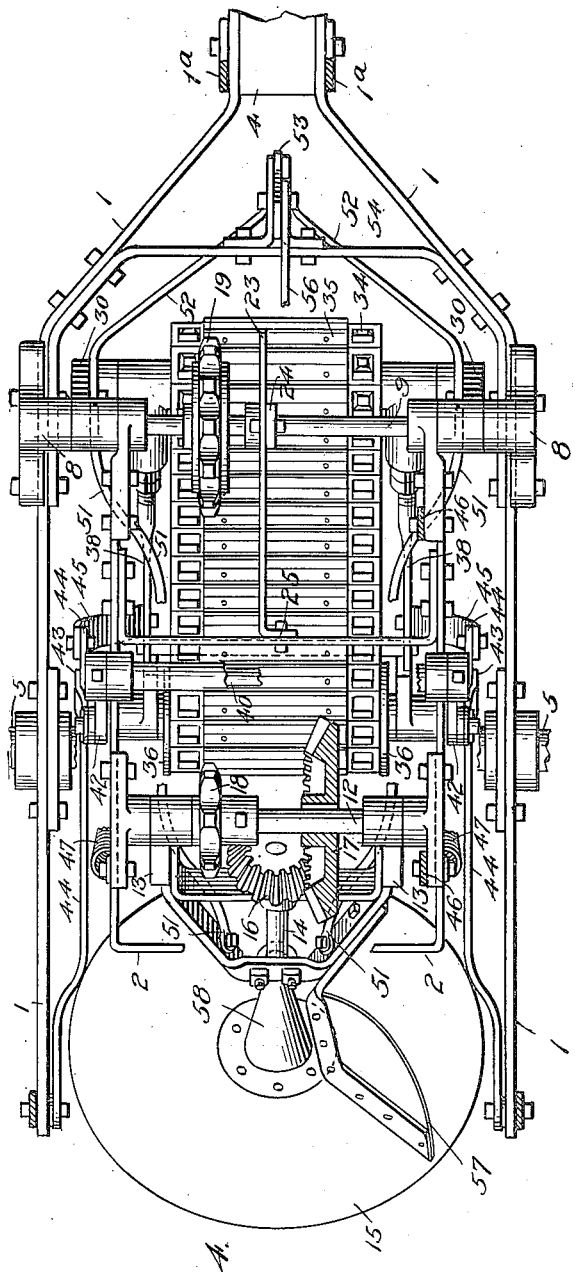

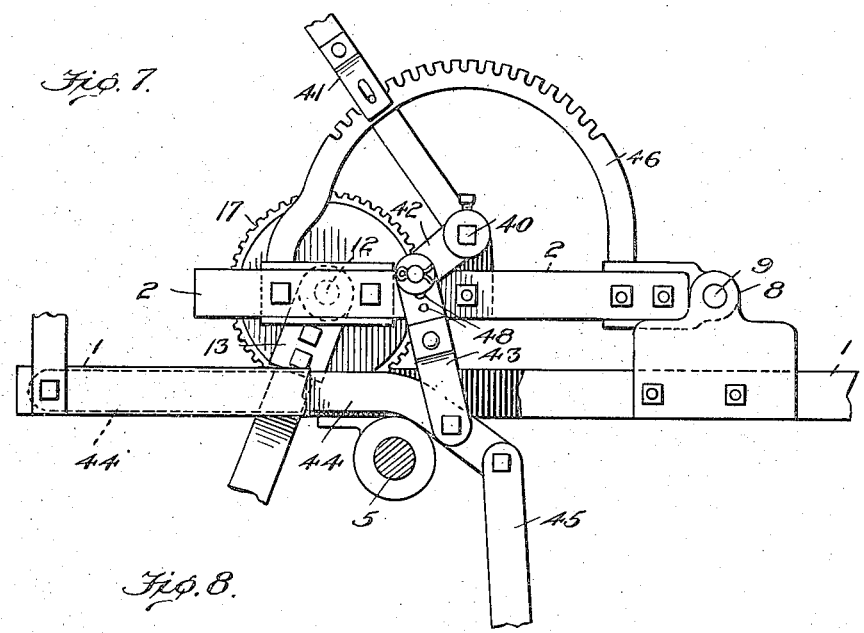
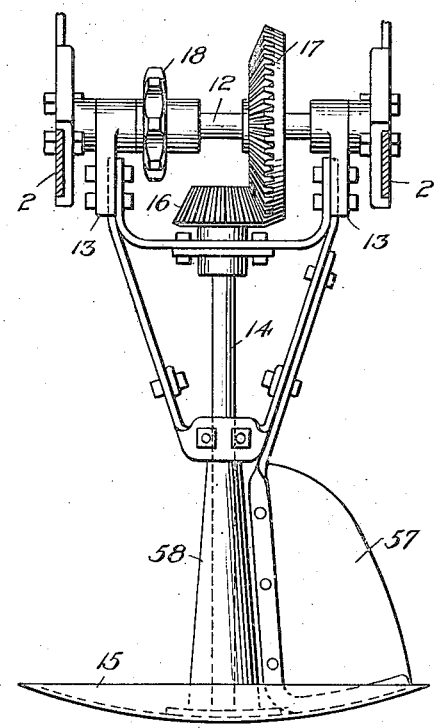
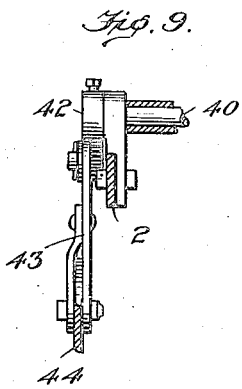

1,462,486

UNITED STATES PATENT OFFICE.

JOHN DEVEY, OF LEHI, UTAH.

BEET-HARVESTING MACHINE.

Application filed June 2, 1921. Serial No. 474,504.

*To all whom it may concern:*

Be it known that I, JOHN DEVEY, a citizen of the United States, residing at Lehi, in the county of Utah and State of Utah, have invented certain new and useful Improvements in Beet-Harvesting Machines; and I do hereby declare the following to be a full, clear, and exact description of the same, reference being had to the accompanying drawings, forming part of this specification.

This invention relates to beet harvesting machines and more particularly to machines for severing the tops of the beets, an operation which is performed before the beet bodies are removed from the soil.

The object of the present invention is to generally improve machines of this character by so constructing and positioning the member which regulates the height of the cutting disk as to prevent injury thereto should said member come in contact with a rock or other similar object and by so connecting said member with the cutting disk that when the height regulating member comes in contact with a large beet, and is thereby elevated a substantial distance, the disk will be raised a relatively shorter distance.

In the accompanying drawings,—

Figure 1 is a side elevation of the machine.

Figure 2 is a similar view of the opposite side of the machine, parts being broken away to permit better illustration of certain other parts.

Fig. 3 is a top plan view of the machine.

Fig. 4 is a similar view with the upper frame members, sprocket chains and operating handles and other portions of the machine omitted to better illustrate the principal working parts of the machine.

Figs. 5 and 6 are detail views of the traveling belt for regulating the height of the cutting disk.

Fig. 7 is a detail view of the operating connections for elevating the disk height regulating frame.

Fig. 8 is a rear detail view of the cutting disk showing the manner in which it is mounted and rotated.

Fig. 9 is another detail view, taken from the rear, showing some of the parts illustrated in Fig. 7.

Machines of the type forming the subject matter of the present invention are adapted to be constructed to simultaneously sever the tops of beets in one or more rows, but, as the operating connections are practically the same, regardless of the number of rows to be operated upon, a machine adapted to operate on only one row is illustrated in order to simplify the ensuing description.

Referring to the accompanying drawings, the main frame of the machine comprises longitudinally extending upper and lower members 1ª, and 1 which converge at their forward ends for attachment of the usual tongue 4. Formed in the lower members 1 of the frame are bearings for an axle 5 carrying the ground wheels 3 and loosely mounted on said axle is a sprocket wheel 6 adapted to be thrown in and out of operation by a clutch mechanism 7ª mounted on the axle and actuated by a lever 7.

Journaled in bearings 8 provided at the forward ends of frame members 1 is a transverse shaft 9 driven by a small sprocket wheel 10 mounted thereon and connected to the sprocket wheel 6 on axle 5 by a sprocket chain 11. Pivotally mounted on shaft 9 and extending rearwardly therefrom is a supplemental frame 2 consisting preferably of a U-shaped frame which is of slightly less width than the main frame and of considerably less length than said frame. Journaled in bearings adjacent the rear end of supplemental frame 2 is a transverse shaft 12 and loosely mounted on said shaft is a pair of depending, converging brackets 13 provided at their lower ends with bearings for a shaft 14. Mounted on the lower end of shaft 14 is the cutting disk 15 which is preferably formed with an upturned edge portion. Secured to the upper end of the disk shaft 14 is a small beveled pinion 16 adapted to cooperate with relatively large pinion 17 on the shaft 12 and mounted on shaft 12 is a sprocket wheel 18 which is connected to another sprocket wheel 19 on shaft 9 by a sprocket chain 20 whereby, when the machine is propelled along the beet row, the cutting disk will be rotated, the relative sizes of the pinions 16 and 17 being such that the cutting disk will be rotated at a comparatively high rate of speed. Suitable idler wheels are provided for holding the sprocket chains 11 and 20 taut, and it will be noted that the operating connections for rotating the disk are all positioned well above the ground where there is no liability of their becoming clogged with dirt. To prevent injury to the operator, who occupies a seat 21 supported on the upper frame member 1ª, the bevel pinions are preferably covered with a plate 22.

In order that the cutting disk 15 may be held down firmly on the beets, a longitudinally extending bar 23 pivoted on a bracket 24 on the supplemental frame 2 has its rear end attached to a cross bar 25 on said frame, and its forward end projects a short distance beyond the machine frame. Adjacent its forward end said bar 23 is provided with a series of apertures 26 for attachment to one end of a spring 27, the opposite end of which is secured to the upper member 1ª of the frame. The tension of spring 27 tends to depress the rear end of the frame 2 and the cutting disk and, by securing the spring in any desired aperture in bar 23, the pressure of the disk on the beets may be regulated at will.

The cutting disk, together with the gage member hereinafter described, are both carried by the supplemental frame 2 and when the machine is not in operation they are adapted to be elevated a considerable distance above the ground by a hand lever 28 pivotally mounted on frame member 1ª and connected to the rear end of the supplemental frame 2 by a chain 29 or other suitable connection passing over an idler on said frame member 1ª. By actuating the lever 28 the rear portion of the supplemental frame will be elevated, carrying with it the cutting disk and gage member.

The gaging member consists of a traveling belt composed of a plurality of metal sections. The adjacent sections are pivotally connected together and when they pass over the sprockets on which the belt is mounted each sections opens the space between it and the next section and dislodges any dirt that may adhere to the belt. The preferred construction of gaging member is as follows:

Pivoted on shaft 9 and spaced transversely of the machine are two depending arms 30 provided at their lower ends with bearings for a transverse shaft 31 having a sprocket wheel 32 mounted thereon and adapted to be driven from a sprocket wheel 39 mounted adjacent one end of shaft 19 and by a sprocket chain 33. Mounted on shaft 31, in spaced relation, are two other sprocket wheels 34 over which the endless traveling belt 35 runs; the opposite end of the reaches of said belt 35 being supported on flanged rollers 36 on a shaft 37 mounted in a pair of arms 38 loosely secured to the shaft 31. As will be seen, the arms 30 and 38, constitute the belt frame the side members of which are each, in effect, formed of pivotally connected sections 30, 38, and said belt frame extends rearwardly and downwardly, the lower end of the belt being located adjacent the rotary cutting disk. By mounting the belt frame in this inclined position liability of the belt or its frame being injured, should it come in contact with a rock, tree stump or the like, is eliminated. This would not be true of a gage belt mounted so that the front end would be the lower end.

To adjust the lower rear end of the belt with respect to the cutting disk, thus regulating the amount of top cut off of the beets, a transverse shaft 40 adapted to be actuated by a hand lever 41, is journaled in brackets on each side of the supplemental frame 2. Intermediate the brackets, shaft 40 is enclosed in a suitable piece of pipe to prevent contact between said shaft and sprocket chain 20 and at its ends, said shaft is made square in cross section and mounted on each squared end of said shaft is a short arm 42. Pivotally connected to each of said arms 42 is a depending link 43 pivotally attached at its lower end to a longitudinally extending bar 44. Bars 44 are pivoted at their rear end to the main frame members 1 and secured to their front ends are depending links 45, the lower ends of which are attached to the lower sections or arms 38 of the side members of the belt frame, one link on each side of said frame. These connections normally support the lower portion of the belt frame when the hand lever 41 is locked in any of its positions by the usual pawl and toothed segment 46, but to partially support said frame when the pawl is released to actuate said lever, the rear end of the belt frame is supported from the supplemental frame 2 by a coil spring 47. The adjustment of the belt frame by the hand lever 41 is supplemented by a second arrangement for adjusting said frame that is preferably used when it is desired to adjust said frame in a position it is to occupy for a considerable length of time. These adjusting means consist of a series of apertures 48 in the link 43, a second series 49 in the belt frame bars 38, and a third series 50 in links 45, whereby the arm 42 and the links 45 may be connected to the links 43 and bars 38, respectively, at any of a number of desired points.

With this arrangement, the cutting disk and ground engaging portion of the gaging belt can each be elevated or depressed independently of the other or, by elevating the supplemental frame, the disk and the entire belt frame can both be raised out of contact with the ground. Furthermore, the belt frame being connected to the pivotally mounted frame, said belt frame is free to elevate the supplemental frame and consequently the cutting disk when it engages a comparatively large beet, the relative positions of the belt frame and disk being such that the disk will be raised only part of the distance the belt is raised. This difference in elevation of the belt and disk is provided because a large beet has a comparatively larger top and it is desirable to cut off a greater amount of top in proportion to the amount of top cut off a smaller beet.

In order that the cutting disk and belt frame may be adjusted rearwardly of the machine, said disk is connected by suitably shaped rods 51 to the depending arms 30 at the forward end of the machine and said arms are in turn connected by links 52 to one end of a bell crank lever 53 pivotally mounted on a cross piece 54 secured between the sides of the main frame. The other end of the bell crank lever 53 is connected to a hand lever 55 by a link 56 and, as will be readily understood, the desired longitudinal adjustment of the belt and disk can be obtained by actuating said hand lever.

To prevent the severed beet tops accumulating on the cutting disk there is provided a scraper 57 rigidly secured to a housing 58 surrounding the shaft 14, said housing serving to prevent entry of dust and dirt into the bearing for the cutting disk at the lower end of shaft 14.

What is claimed is:

1. In a beet topping machine, the combination of a vertically movable cutting disk for severing the tops of the beets, a sectional height regulating member for the cutting disk connected to the latter and having a ground engaging body portion movable vertically a relatively greater distance than the cutting disk when said member comes in contact with a beet, means for adjusting one section of the regulating member relatively to the cutting disk, and means for raising and lowering the rotary cutting disk and regulating means to an inoperative position.

2. In a beet topping machine, the combination with the main frame, of a vertically movable rotary cutting disk positioned near the rear of the main frame, an elongated inclined belt frame pivotally mounted at its upper end adjacent the forward end of the main frame and having its lower end positioned adjacent the cutting disk and in proximity to the surface of the ground, a traveling belt carried by the belt frame, means for elevating the lower end of said belt frame independently of the cutting disk, and connections between the cutting disk and belt frame whereby vertical movement of the rear end of the belt frame caused by the belt coming in contact with a beet will impart a vertical movement to the cutting disk.

3. In a beet topping machine, a main frame, a supplemental frame pivotally mounted at one of its ends on the main frame whereby its opposite free end may be raised and lowered, a pivoted rotary cutting disk carried by the supplemental frame, an inclined belt frame pivotally mounted at its upper end on the main frame and having its rear end connected to the supplemental frame said belt frame and disk being mounted on parallel axes, and a traveling endless belt carried by the belt frame, the rear end of said frame being normally positioned to permit the belt to engage the beets.

4. In a beet topping machine, a main frame, a supplemental frame pivotally mounted at one of its ends on the main frame whereby its opposite free end may be raised and lowered, a cutting disk carried by the supplemental frame, an inclined belt frame pivotally mounted at its upper end on the main frame and having its rear end connected to the supplemental frame, and a traveling endless belt carried by the belt frame, the rear end of said frame being normally positioned to permit the belt to engage the beets, and means for elevating the cutting disk and belt frame out of their operative positions and means carried by the supplemental frame for elevating the belt frame independently of the cutting disk.

5. In a beet topping machine, the combination with the main frame and ground wheel axle, of a sprocket wheel carried on said axle, a rotatable shaft carried on the main frame, a sprocket wheel mounted on said shaft, a supplemental frame loosely secured on said shaft, a second shaft journaled on the supplemental frame and movable vertically independently of the first shaft a sprocket wheel and bevel gear on the second shaft, sprocket chains connecting said sprocket wheels, a depending rotatable shaft carried by the supplemental frame, a cutting disk mounted on the lower end of said depending shaft and a pinion mounted on its upper end and adapted to engage said bevel gear.

6. In a beet topping machine, a cutting disk, a pivotally mounted belt frame having side members each formed of pivotally connected sections, means for elevating the entire belt frame, and means for elevating one section of each of said frame side members independently of the other section of said members.

7. In a beet topping machine, a main frame, a cutting disk, a disk height regulating frame comprising two side members each formed of upper and lower pivotally connected sections, said upper sections being pivotally mounted on the main frame, connections between said upper sections and the cutting disk, means for elevating said disk, and the entire regulating frame, and means for separately elevating the lower sections of the regulating frame side members.

8. In a beet topping machine, a cutting disk, a disk height regulating frame composed of upper and lower sections, and means for elevating the lower frame section independently of the upper section.

9. In a beet topping machine, a cutting disk, a disk height regulating frame composed of pivotally connected upper and lower sections, connections between said disk and frame, and means for simultaneously elevating the entire frame and disk.

10. In a beet topping machine, a cutting disk, a disk height regulating frame composed of pivotally connected upper and lower sections, connections between said frame and disk, means for simultaneously elevating the entire frame and disk, and means for separately elevating the lower section of said frame alone.

JOHN DEVEY.